Dec. 29, 1959 K. TESCH 2,918,856
DIAPHRAGM MOUNT FOR PHOTOGRAPHIC OR CINEMATOGRAPHIC OBJECTIVES
Filed July 26, 1957
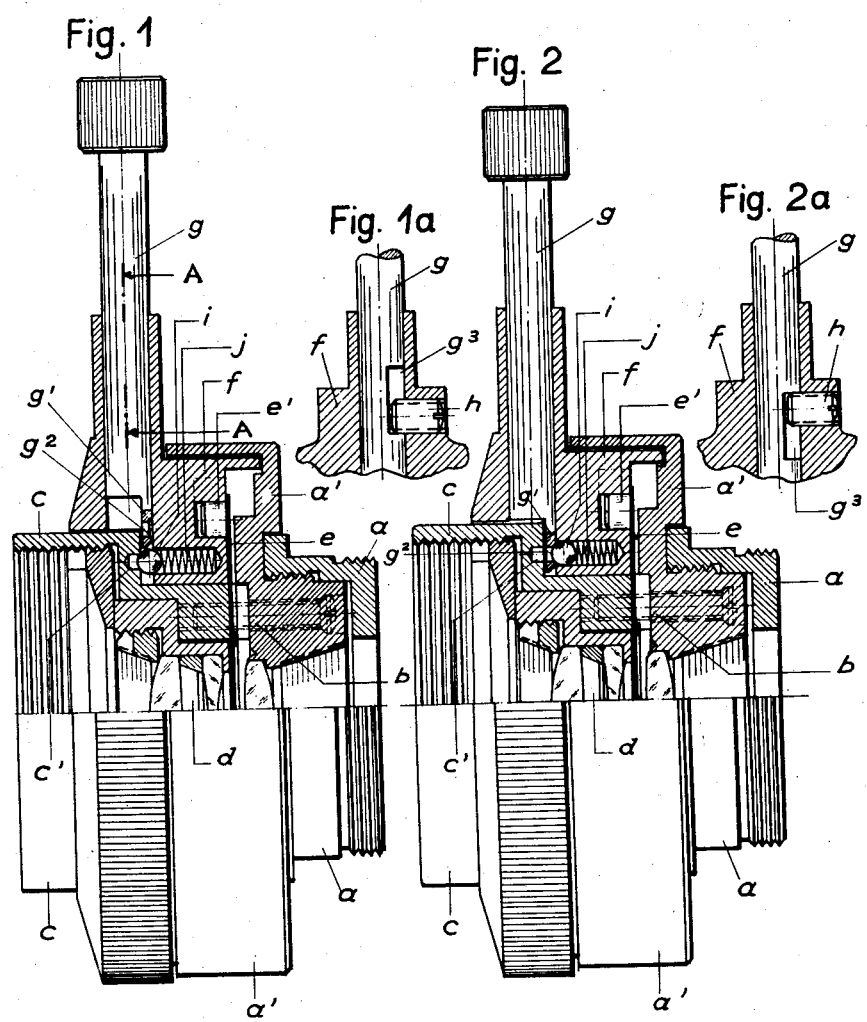
Inventor:
KARL TESCH
BY
Karl F. Ross
AGENT

United States Patent Office 2,918,856
Patented Dec. 29, 1959

2,918,856

DIAPHRAGM MOUNT FOR PHOTOGRAPHIC OR CINEMATOGRAPHIC OBJECTIVES

Karl Tesch, Kreuznach, Rhineland, Germany, assignor to Jos. Schneider & Co., Kreuznach, Rhineland, Germany, a company of Germany Application July 26, 1957, Serial No. 674,449

Claims priority, application Germany August 13, 1956

6 Claims. (Cl. 95—64)

My present invention relates to photographic or cinematographic camera objectives having means for indexing a diaphragm in a plurality of operating positions corresponding to different diaphragm openings.

The usual indexing means employed for this purpose, taking the form of a spring-urged detent in one of two relatively movable members (e.g. rings) co-operating with a series of notches or recesses in the other member, will not prevent the adjustment of the diaphragm from wide-open to substantially closed position (or vice versa) in a single sweep but will interfere with such adjustment to the extent of making the movement of the diaphragm-control member rough and uneven. This is undesirable from an esthetic viewpoint where, as in the taking of motion pictures, the sweep of the diaphragm is used to provide the effects of fade-in or fade-out. Also, repeated rapid movement of the control member past the established diaphragm stops will tend to cause undue wear to the indexing mechanism itself.

My invention has for its general object the provision of means for temporarily de-activating the indexing mechanism whenever a sweep adjustment of the diaphragm is desired.

The invention accomplishes this object by the provision of a blocking element selectively operable to engage the spring-urged detent (e.g. a ball check) and to maintain the latter out of contact with the member bearing the co-operating recesses.

According to a more specific feature of this invention, the blocking element is formed as an extremity of a radially displaceable slider projecting from the member (e.g. the rotatable diaphragm-control ring) which carries the detent; advantageously, this extremity has a beveled edge, adapted to cam the detent away from a notch engaged thereby, and is provided with a depression to receive this detent in the inoperative position of the latter.

The above and other objects and features of my invention will become more fully apparent from the following detailed description of a preferred embodiment, reference being had to the accompanying drawing in which:

Fig. 1 shows, partly in elevational view and partly in axial section, a camera objective whose diaphragm mount is provided with a detent-blocking mechanism according to the invention;

Fig. 1a is a detail view taken on the line A—A of Fig. 1;

Fig. 2 is a view similar to Fig. 1, showing the parts in an actuated position of the detent-blocking mechanism; and Fig. 2a is a view similar to Fig. 1a but showing the parts in a position corresponding to Fig. 2.

The objective shown in the drawing has a housing comprising the threadedly interconnected parts $a$ and $a'$. A stationary lens mount $c$, linked with this housing by one or more screws $b$, carries the optical system $d$. Interposed between the lenses of system $d$ is a conventional iris diaphragm $e$ whose aperture is adjustable by means of a pin $e'$ received in a recess of a rotatable control ring $f$.

The relative rotation of control ring $f$ and annular lens mount $c$ can be yieldably arrested, in a series of pre-established stop positions, by the co-operation of a ball check $i$, under pressure from a spring $j$, with a plurality of recesses $c'$ (only one shown) angularly spaced on a radial shoulder of member $c$. It will be understood that this arrangement serves, in the conventional manner, to index the control ring $f$ in various operative positions each corresponding to a particular diaphragm opening indicated on the usual diaphragm scale (not shown).

In accordance with this invention I provide a blocking mechanism for selectively disengaging the ball-shaped detent $i$ from the recesses $c'$ whenever it is desired to have free movement of the control ring $f$. This mechanism comprises a stem $g$ which is radially slidable in ring $f$ and whose inner extremity is in the form of a lug $g'$ adapted to be interposed between ball $i$ and ring $c$. Lug $g'$ has an aperture $g^2$ designed to receive the ball $i$ after the latter has been cammed to the right (as viewed in Figs. 1 and 2), against the force of its spring $j$, upon an inward displacement of stem $g$ by the fingers of the user. As illustrated in Figs. 1a and 2a, stem $g$ is held against rotation in ring $f$ by a setscrew $h$, entering an elongated recess $g^3$ on the side of the stem, which also limits the extent of its radial displacement.

The slightly chamfered periphery of aperture $g^2$ enables ready withdrawal of stem $g$ into the position shown in Fig. 1 whenever it is desired to let the detent $i$ re-engage the notches $c'$ of ring $c$ for normal indexing operation.

My invention is, of course, not limited to the specific embodiment described and illustrated but may be realized in various modifications and adaptations without departing from the spirit and scope of the appended claims.

I claim:

1. In a camera objective, in combination, a diaphragm having an adjustable aperture, a diaphragm mount comprising a pair of relatively rotatable rings linked with said diaphragm for changing its aperture by their relative rotation, one of said rings being provided with at least one recess, the other of said rings being provided with a spring-urged detent adapted to enter said recess in an intermediate stop position for camming engagement therewith so as yieldably to arrest said rotation, and blocking means for temporarily inactivating said detent, said blocking means including a slider carried on said other of said rings with freedom of relative radial displacement only and a cam-shaped extremity on said slider interposable between said detent and said recess in a limiting radial position of said slider.

2. The combination according to claim 1, wherein said rings include a fixed ring and a rotatable control ring, said recess being provided in said fixed ring.

3. The combination according to claim 2, further comprising stop means on said control ring for limiting the radial displacement of said slider.

4. The combination according to claim 2, wherein said extremity is provided with a depression adapted to receive said detent in said limiting slider.

5. A camera objective comprising a housing, a first annular member fixed to said housing, lens means and a diaphragm with adjustable aperture supported by said first annular member, a second annular member rotatable relatively to said first annular member and provided with control means for adjusting the aperture of said diaphragm, one of said annular members being provided with at least one recess, the other of said annular members being provided with a spring-urged ball check adapted to enter said recess in an intermediate stop position for camming engagement therewith so as yieldably to arrest the rotation of said second annular member, and blocking means for temporarily inactivating said ball check, said blocking means including a slider carried on said other annular member with freedom of relative radial displacement only and a cam-shaped extremity on said slider adapted to be interposed between said ball check and said recess by displacing said ball check against its spring force.

6. A camera objective according to claim 5, wherein said ball check and said cam-shaped element are mounted on said second annular member.

References Cited in the file of this patent

UNITED STATES PATENTS

| | | |
|---|---|---|
| 1,417,527 | Howell | May 30, 1922 |
| 2,222,298 | Nerwin | Nov. 19, 1940 |
| 2,487,308 | Castedello | Nov. 8, 1949 |
| 2,527,243 | Cronholm | Oct. 24, 1950 |
| 2,612,093 | Schutz | Sept. 30, 1952 |